(12) United States Patent
Krueger et al.

(10) Patent No.: US 9,506,454 B2
(45) Date of Patent: Nov. 29, 2016

(54) SYSTEMS AND METHODS FOR REGULATING WIND TURBINES

(75) Inventors: Thomas Krueger, Tilst (DK); Jens Geisler, Rendsburg (DE); Stefan Schrader, Kiel (DE)

(73) Assignee: SENVION SE, Hamburg (DE)

( * ) Notice: Subject to any disclaimer, the term of this patent is extended or adjusted under 35 U.S.C. 154(b) by 439 days.

(21) Appl. No.: 13/640,281

(22) PCT Filed: Apr. 8, 2011

(86) PCT No.: PCT/EP2011/055536
§ 371 (c)(1),
(2), (4) Date: Oct. 9, 2012

(87) PCT Pub. No.: WO2011/124696
PCT Pub. Date: Oct. 13, 2011

(65) Prior Publication Data
US 2013/0026759 A1 Jan. 31, 2013

(30) Foreign Application Priority Data
Apr. 8, 2010 (DE) .................. 10 2010 014 165

(51) Int. Cl.
F03D 7/00 (2006.01)
F03D 7/04 (2006.01)
F03D 7/02 (2006.01)

(52) U.S. Cl.
CPC ............ *F03D 7/042* (2013.01); *F03D 7/0272* (2013.01); *F03D 7/0276* (2013.01);
(Continued)

(58) Field of Classification Search
CPC .... F03D 7/042; F03D 7/0276; F03D 7/0272; F05B 2270/32; F05B 2270/101

USPC .............. 290/44, 55; 700/286, 287
See application file for complete search history.

(56) References Cited

U.S. PATENT DOCUMENTS 4,584,486 A * 4/1986 Quynn ........................ 290/44
4,695,736 A * 9/1987 Doman et al. ............... 290/44
(Continued)

FOREIGN PATENT DOCUMENTS

| WO | WO-2005/025026 | 3/2005 |
|----|----------------|--------|
| WO | WO-2010/000663 | 1/2010 |
| WO | WO 2010/000663 A1 * | 1/2010 |

OTHER PUBLICATIONS

Morren, J. et al. (2006). "Inertial Response of Variable Speed Wind Turbines," *Electric Power Systems Research* 76(11):980-987.
(Continued)

*Primary Examiner* — Julio Gonzalez Ramirez
(74) *Attorney, Agent, or Firm* — Morrison & Foerster LLP

(57) ABSTRACT

A wind energy installation having a wind rotor, a generator which is driven thereby and interacts with a converter in order to produce electrical power, rotation-speed regulation and converter control which interacts therewith, wherein the rotation-speed regulation outputs a nominal rotation speed signal ($n_{ref}$). Furthermore, additional regulation is provided, which has an input for an additional power and is designed to produce a rotation speed change signal therefrom, taking account of a rotator inertia moment, and to output this as an output signal, which is added to the nominal rotation speed signal via a logic element. Kinetic energy is taken from the wind rotor in a controlled manner by reducing the rotation speed and is converted by the generator to additional electrical energy. This allows primary regulation power to be made available deliberately by rotation speed variation, to be precise even in unsteady wind conditions.

31 Claims, 8 Drawing Sheets

(52) U.S. Cl.
CPC ... *F05B 2260/821* (2013.01); *F05B 2270/101* (2013.01); *F05B 2270/304* (2013.01); *F05B 2270/32* (2013.01); *F05B 2270/336* (2013.01); *Y02E 10/723* (2013.01)

(56) References Cited

U.S. PATENT DOCUMENTS

| | | | | |
|---|---|---|---|---|
| 4,700,081 | A * | 10/1987 | Kos et al. | 290/44 |
| 8,067,845 | B2 * | 11/2011 | Thulke et al. | 290/44 |
| 2002/0105189 | A1 * | 8/2002 | Mikhail et al. | 290/44 |
| 2007/0085343 | A1 * | 4/2007 | Fortmann | 290/44 |
| 2008/0136188 | A1 * | 6/2008 | Krueger | 290/44 |
| 2011/0153099 | A1 * | 6/2011 | Garcia | 700/287 |

OTHER PUBLICATIONS

Janssens, N. A. et al., (Jul. 2007). "Active Power Control Strategies of DFIG Wind Turbines," *IEEE Power Tech 2007*, 516-521.

Morren, J. et al., (Feb. 2006). "Wind Turbines Emulating Inertia and Supporting Primary Frequency Control," *IEEE Transactions on Power Systems* 21(1): 433-434.

Svensson, J. et al., (Apr. 1, 2002) "Wind Farm Control Software Structure," *International Workshop on Transmission Networks for Offshore Wind Farms*, pp. 1-15.

International Search Report mailed Jan. 24, 2012, directed to International Application No. PCT/EP2011/055536; 6 pages.

International Preliminary Report on Patentability and Written Opinion dated Oct. 9, 2012, directed to International Application No. PCT/EP2011/055536; 14 pages.

* cited by examiner

Fig. 5
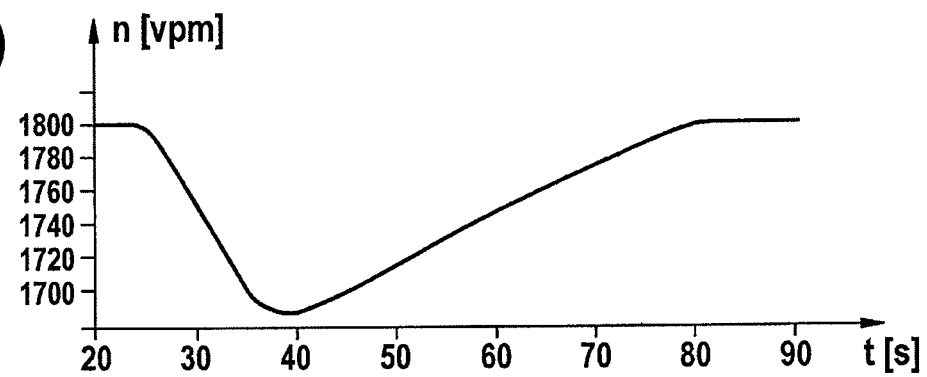
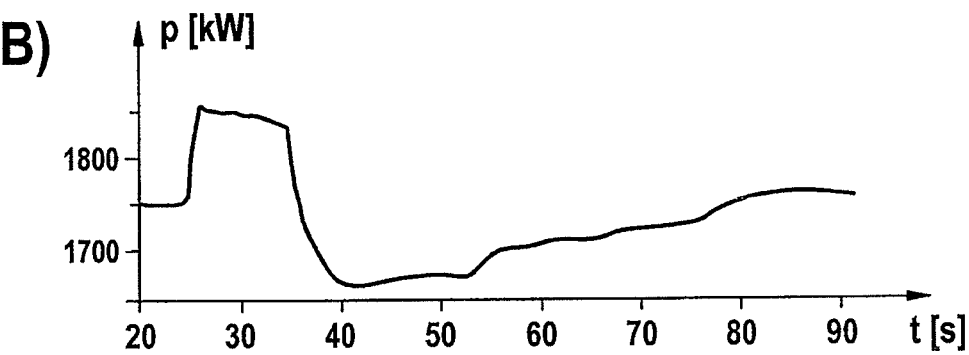
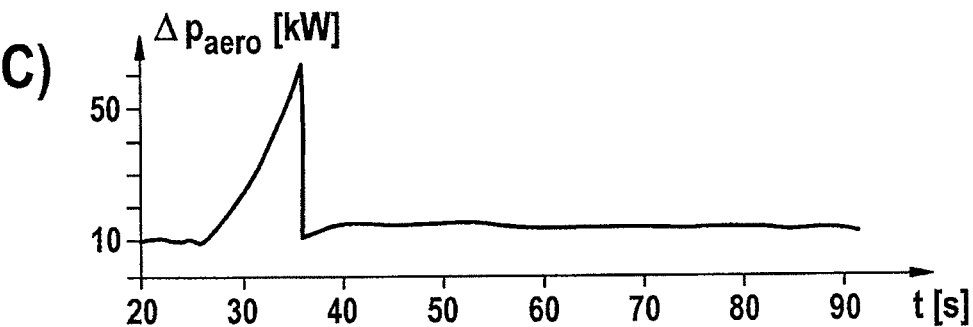

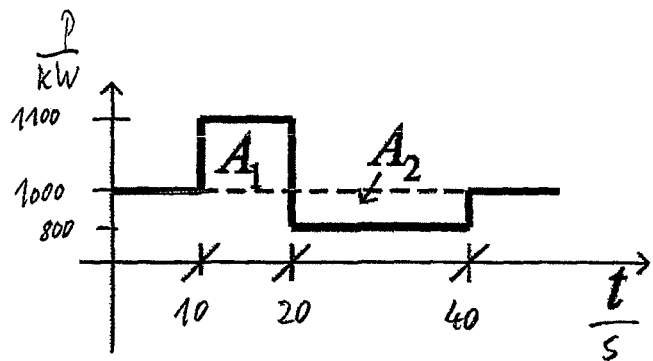
a)
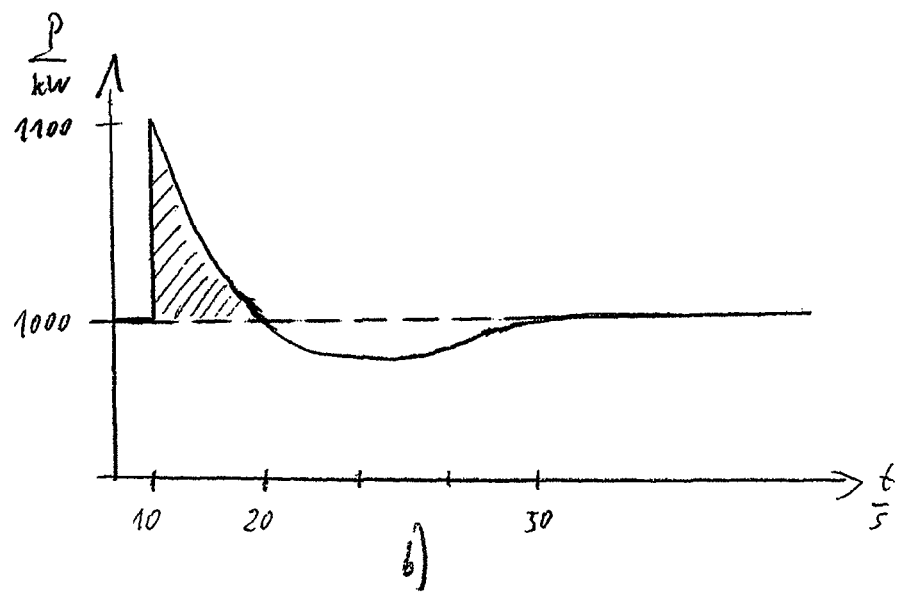
b)
Fig 8

SYSTEMS AND METHODS FOR REGULATING WIND TURBINES

REFERENCE TO RELATED APPLICATIONS

This application is a national stage application under 35 USC 371 of International Application No. PCT/EP2011/055536, filed Apr. 8, 2011, which claims the priority of German Application No. 10 2010 014 165.8, filed Apr. 8, 2010, the entire contents of which are incorporated herein by reference.

FIELD OF THE INVENTION

The invention relates to a wind turbine having a wind rotor, a generator driven by the latter and which interacts with a converter to generate electrical power, a speed regulator, and a converter control unit interacting with the latter, the speed regulator outputting a target speed signal to the converter control unit.

BACKGROUND OF THE INVENTION

As wind turbines become increasingly widespread, there is a requirement for them to make significant contributions to the stability of the grid. An important aspect here is the provision of so-called balancing power. This is traditionally usually provided by conventional power stations, in particular coal- or gas-fired power stations, and to be precise in the form of power that can be additionally called up within a few seconds (primary balancing power). In order to be able to ensure such a rapid reaction, the corresponding power stations must be kept running permanently. This is expensive and entails a high consumption of fuel that is in many cases not used at all when balancing power is not called up. To reduce this cost, wind turbines are also included in the supply of primary balancing power.

A problem here is that for wind turbines the power output is determined by the wind and cannot be increased on demand, in contrast to conventional power stations. In order to be able to use wind turbines to provide primary balancing power, in spite of this limitation, it is known to obtain the required primary balancing power from the kinetic energy of the rotor. Various methods have been developed to do this:

In a first method, the operating point of the wind turbine is altered as a precautionary measure. The wind turbine is adjusted, by changing certain operating parameters and in particular the pitch angle of the rotor blades, in such a way that it is operated suboptimally (Janssens, N. et al: "Active Power Control Strategies of DFIG Wind Turbines", IEEE Power Tech 2007, Lausanne, Switzerland, 1-5 Jul. 2007). It is thus possible to shift operating parameters on demand toward the optimum operating point and thus to output more power even with the same amount of wind and call it up as primary balancing power. A disadvantage of this approach is that, in normal operation (when there is no demand for balancing power), less power is generated by the wind turbine than is actually possible because of the suboptimal operating point.

In an alternative approach, the operating point is changed only when required, i.e. to draw off additional electrical power as primary balancing power. The speed regulator of the wind turbine is hereby modified in the short term and the target value for the power to be output is increased according to the primary balancing power which needs to be additionally output (for example by raising the target torque (Morren, J. et al: "Wind Turbines Emulating Inertia and Supporting Primary Frequency Control", IEEE Transactions on Power Systems, vol. 21, no. 1, February 2006)). Although these and other known methods are simple, they do not take account of the influence of changes in the wind conditions during the provision of primary balancing power. These known methods are instead designed exclusively for stationary operating conditions and hence for unchanging wind conditions. This entails the disadvantage that in the event of non-stationary wind conditions—as are frequently encountered in practice—only a relatively poor provision of primary balancing power is achieved.

SUMMARY OF THE INVENTION

The object of the invention is to provide an improved regulation system for wind turbines that provides sufficient primary balancing power even in the event of non-stationary wind speeds.

The solution according to the invention is provided in the features as broadly described herein. Advantageous developments are the subject of the detailed embodiments described below.

In a wind turbine having a wind rotor, a generator driven by the latter and which interacts with a converter to generate electrical power, a speed regulator, and a converter control unit interacting with the latter, the speed regulator outputting a target speed signal, according to the invention an additional regulation system is provided that has an input for a desired additional power and is designed so as to generate therefrom a change of speed signal, taking into account a moment of inertia of the rotor, and output it as an output signal that is added to the target speed signal via a logical element.

The invention is based on the concept of, instead of regulating the power output to the grid by the wind turbine, controlling the energy derived from the centrifugal mass of the wind rotor (as it were at the input to the system of the wind turbine). By determining a signal for a change of speed from the additional regulation system, the centrifugal mass of the wind rotor is thus controlled and a certain amount of energy derived. This energy corresponds to the difference between the kinetic energy stored in the centrifugal mass before and after the change of speed has been taken into account. This enables the kinetic energy called up from the wind rotor per unit of time to be controlled as part of an "energy tracking" process. The kinetic energy increases the mechanical power acting on the generator, which can be converted by the generator into a correspondingly increased electrical power, as kinetic support power. The desired primary balancing power is made available in this way.

The invention enables the additional power that is made available to be drawn exclusively from the centrifugal mass of the rotor, and the power generated by the wind thus has no effect. The "metering" of the additionally supplied power, i.e. the primary balancing power, is thus effected solely via the change of speed signal. It is independent of the actual amount of wind available so that precise provision of the primary balancing power is ensured even in the case of fluctuating wind conditions, in particular even when the wind speed falls markedly. The invention combines these considerable advantages in terms of providing primary balancing power with only low cost demands. There is in particular no need for additional hardware and the additional regulation system according to the invention can generally be implemented in the operational control system that is already present.

The term target speed signal is understood to be the initial value of the speed regulation that is applied as a parameter to the speed control system of the wind turbine and/or to the generator or the converter connected to the generator in order to set the generator speed. In most cases this is a target speed signal itself but it can also be a target torque signal. These signals are also included under the term "target speed signal" which is to be understood from a functional point of view.

The converter control system is understood to be a device that controls the output of electrical power via the mechanical/electrical energy converter formed by the generator and converter. It usually acts directly on the converter but it is not excluded that it also acts alternatively directly on the generator.

The additional regulation system is understood to be a device that is independent from the speed regulation system that is conventionally present as part of an operating control system of the wind turbine. It preferably has speed feedback.

A correction element is preferably provided that is designed to modify parameters of the additional regulation system as a function of the additional power called up. These parameters also include the quantity of the additional power. Using this correction element, it can be taken into account that, when the additional power is called up, the wind turbine runs as a result at a reduced speed outside its optimum operating conditions and consequently induces a loss of power. If this induced loss of power is not taken into account, this could result in the desired quantity of additional power not being achieved. The correction element can handle this in an appropriate fashion. The correction element thus preferably has a characteristic element. This establishes a correction value for the target speed as a function of the additional power demanded.

An aerodynamic estimator is preferably also provided that estimates the aerodynamic efficiency of the wind rotor. The power that can be obtained from the wind and—when additional power is called up—the loss of power resulting from the deoptimization can be determined from the determination of this efficiency, together with the wind speed. To prevent this loss of power from having an effect on the power output of the wind turbine, the power specification can handle this in an appropriate fashion. The initial value of the aerodynamic estimator is thus added to the demand for additional power by means of a logic element. The stable provision of the additional power is thus ensured in the event of high demands for additional power for which significant changes to the aerodynamics of the wind rotor can result. The wind speed is preferably provided as an input value to the aerodynamic estimator. It may be an actual measured value. However, a wind observer is advantageously provided that determines the wind speed from parameters that are already present in the operating control system, in particular the output electrical power, set angle of the wind rotor and the rotor speed. It is thus possible to achieve a particularly good operating behavior of the aerodynamic estimator.

A suppression element is preferably also provided that blocks the additional regulation system under full load. This is based on the recognition that, when operating under nominal load, i.e. at a wind speed above the nominal wind speed, sufficient power can be provided by the wind itself and there is therefore no need to derive any required additional power from the kinetic energy of the wind rotor. An unnecessary reduction in rotor speed at high wind speed is thus prevented. The suppression element advantageously has a start module that is designed to permit a short-term change in speed for changing additional power demands and so to override the suppression module. Short-term is here understood to be a period of approximately 2 to 60 seconds. This is based on the recognition that under full load a few seconds are required to adjust the pitch of the blades of the wind rotor in order to set a new pitch angle with which the required additional power can be derived from the wind. In order to bridge this period until the new pitch angle is set, the required additional power can be provided in the short term from a speed reduction of the additional regulator. The response behavior of the wind turbine to the requirement for additional power under nominal load is thus improved.

In a preferred embodiment that may provide independent protection, a module for monitoring threshold values is provided that limits or deactivates the additional regulation system as a function of the threshold value being exceeded. As a result, when providing additional power the wind turbine is not operated within an operating range that damages or overloads the wind turbine. In particular, threshold values of this type are electrotechnical design limits such as apparent current, active current or reactive current, voltages or thermal limits on the semiconductors of the converter, in particular a maximum permissible power. The exceeding of the threshold value can, however, also be the exceeding of a preferably speed-dependent threshold torque (for example, implemented in a speed-dependent characteristic element) so that operation within an overloaded operating range is prevented by limiting the additional regulator. In a particularly preferred development, the module for monitoring the threshold value monitors the exceeding of a threshold value of the output value of the aerodynamic estimator. It is thus indicated that a critical aerodynamic loss has been exceeded so that, after providing the additional power, the wind turbine requires a disproportionate amount of power to resume the normal speed. It is thus made possible to detect in advance, as it were pre-emptively, negative effects from providing the additional power on the ongoing operation of the wind turbine, and possibly to limit the provision of the additional power. It can thus in particular be prevented that the recovery phase after the additional power has been provided lasts for a disproportionately long time and results in a correspondingly reduced feeding of power to the grid.

The additional regulation system preferably also comprises a torque limiting element. Thus when additional power is required the torque that acts as a whole is limited to a value that can be set. This value that can be set can originate in stationary fashion or preferably from a characteristic element. This not only serves to prevent overloading of the drive train but also, when using a characteristic element, has the advantage that determined operating ranges can be avoided or completed more quickly. It is thus in particular expedient to design the torque limiting element in such a way that the torque is greatly limited in the synchronous speed range. The converter is thus prevented from being overloaded.

In a preferred embodiment, the characteristic can be switched from the originally used characteristic to a characteristic with a higher torque. A characteristic switching module is provided to do this that interacts with the speed regulation system of the wind turbine. When additional power is required, the characteristic is switched to a different characteristic that provides more torque than the original characteristic. The power output can thus be increased immediately. The term "characteristic" here includes both working and/or threshold characteristics. Switching to a different characteristic can be understood to be switching to a different regulating characteristic and/or continuing the regulation within a changed working range, in particular one that is enlarged in terms of the permissible torque.

In order to prevent overloading of in particular the electrical components such as the generator and the converter, this increase in power, which is in fact an increase in active power, is combined with a limitation of the reactive power output. The reactive power is thus reduced so that the electrical components do not exceed the maximum permissible currents. In many cases, this can require the reactive power output not just to be greatly limited but even to be blocked or "zeroed".

A device for determining the additional power is preferably provided that is designed so as to determine the additional power using the frequency measured in the grid. As a result, there is no need to wait until a central target value for the additional power has been specified and instead it is possible to react immediately after the disruption has occurred in the electricity grid. Different alternative determining regulators can thus be provided in the device for determining the additional power. It may firstly be provided that the additional power is determined in proportion to the frequency deviation, the additional power increasing as the size of the frequency deviation grows. It may, however, secondly also be provided that the additional power can be increased in a stepped fashion depending on the specific values of the frequency deviation. It may, however, thirdly also be provided that the maximum possible additional power is called up only after a certain frequency deviation has been exceeded. The frequency deviation of the determining regulator mentioned by way of example can here be determined as a deviation of the actual value of the frequency from a target value or target value range of the frequency in the electricity grid.

The device for determining the additional power preferably interacts with a dynamic module that preferably determines the additional power from the depth and/or the time gradients of a dip in the frequency in the grid. In particular concrete specifications from the grid operator as to how a wind turbine should react to a dip in frequency by feeding in additional power can thus be implemented efficiently. This applies all the more so when different functions are implemented separately for the beginning and end by means of an increasing element and a decay element. It may thus be provided for example that, when a frequency deviation is detected for a certain period, for example 10 seconds, the wind turbine additionally feeds in 10% additional power, wherein thereafter the power output of the wind turbine cannot drop below a certain percentage of the initial value, i.e. must be for example at least 80% of the power fed in before the frequency disruption for at least 20 seconds. Other functions for increasing and decay are of course possible.

The additional regulator preferably comprises a speed gradient module that is designed to limit the remaining power to minimum power after the supply of additional power is completed. After the feeding-in of the additional power is completed, the wind turbine requires additional energy from the wind in order to resume the speed range that is normal in the respective wind conditions. After the generation of additional power is completed, the speed gradient module causes the speed to rise again as a priority (with a minimum gradient) so that an aerodynamically favorable operating range (ratio between speed and wind speed) can be quickly restored. The speed is thus prevented from dropping so far that the wind turbine generates so little power that it switches itself off, no longer meets its own power use, or falls below a minimum torque that is necessary for secure operation of the wind turbine. Only after a certain increase in speed does a further build-up in speed occur with a maximum gradient, so that power is now generated for feeding into the grid (it preferably being necessary to observe a minimum gradient that is now reduced). The invention thus resolves the problem of conflicting objectives that, after the feeding-in of the additional power is completed, on the one hand as much power as possible needs to continue to be fed in, and on the other hand the wind turbine needs to be restored quickly to an efficient and stable operating range.

The invention also relates to a wind farm having multiple wind turbines that are each provided with a wind rotor, a generator driven by the latter and with a converter to generate electrical power, a speed regulator of a converter control unit interacting with it, the speed regulator outputting a target speed signal, and a wind farm control center is also provided for the high-level regulation of the wind turbines, according to the invention an additional regulator being provided on at least some of the wind turbines that has an input for additional power and is designed so as to generate a change of speed signal therefrom, taking into account a moment of inertia of the rotor, and to output it as an output signal that is added to the target speed signal via a logic element, and the wind farm control center having an inertia control module that apportions required additional power to the rotating wind turbines. This apportioning preferably takes place in such a way that all the rotating wind turbines are controlled without taking into account the power output by them. It is thus achieved that as many of the wind turbines as possible participate in providing the additional power, and to be precise those that currently output only a small amount of power. As a result, not only is the load on such wind turbines that output a high degree of effective power relieved, but there is also a better stochastic distribution over the wind farm so that wind-related fluctuations can be compensated better stochastically.

The invention also comprises corresponding methods for operating the wind turbine or the wind farm. Reference is made to the explanation above for a more detailed description.

BRIEF DESCRIPTION OF THE DRAWINGS

The invention is explained in detail below with reference to the attached drawings in which advantageous exemplary embodiments are shown, in which:

FIG. 5 shows a diagram of the mode of operation of the additional correction element;

FIG. 8 shows diagrams for increase and decay functions.

DETAILED DESCRIPTION OF THE INVENTION

Figure 1:
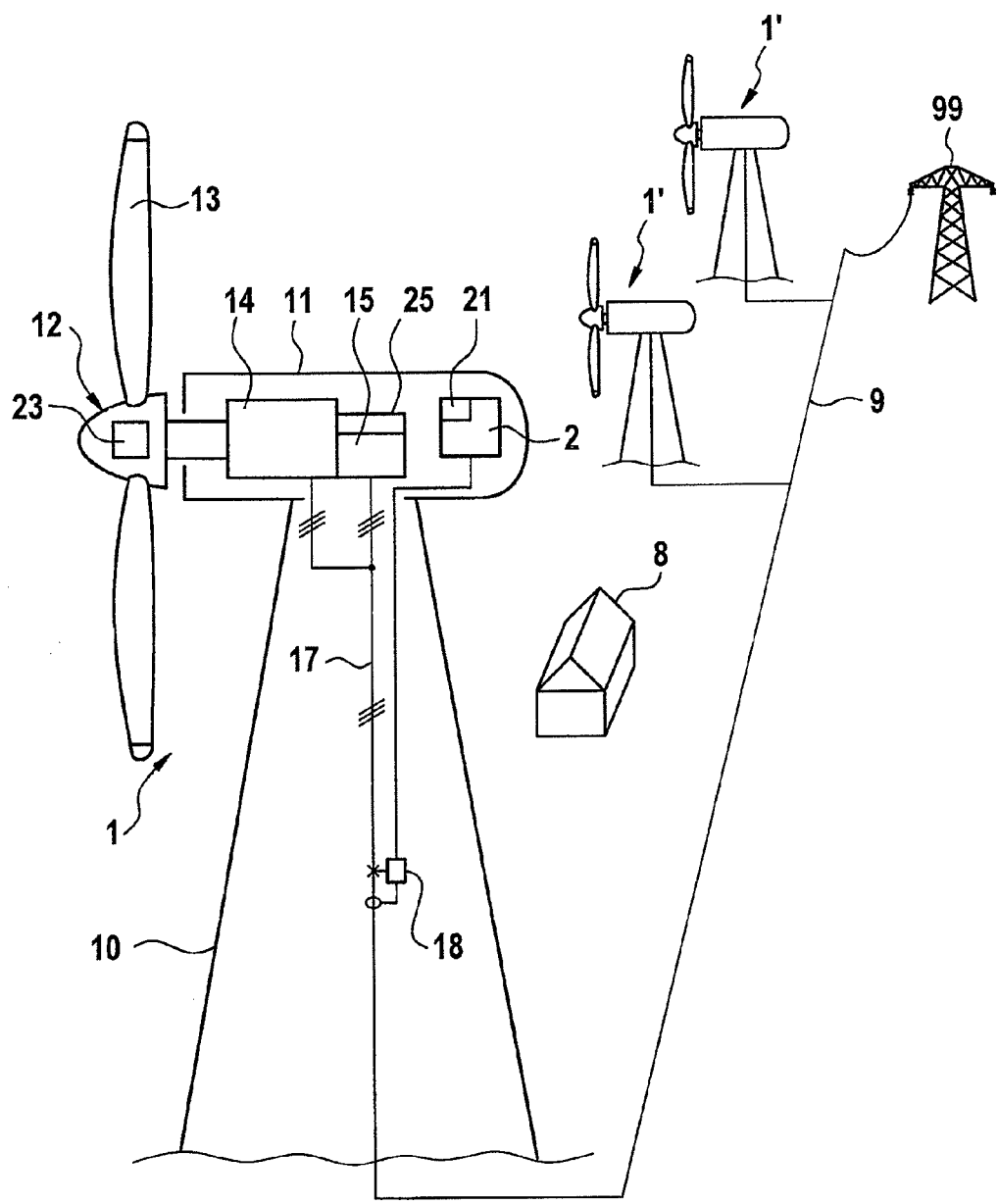
FIG. 1 shows an overview of a wind turbine in an exemplary embodiment of the invention.

The main features of a wind turbine 1 according to an exemplary embodiment of the invention have a conventional design. It comprises a mast 10, on the upper end of which a nacelle 11 is pivotably arranged in an azimuth orientation. A wind rotor 12 that is provided with multiple rotor blades 13 that can be adjusted in terms of their set angle is rotatably arranged on its end face. A pitch regulating device 23 is provided to adjust the set angle. The wind rotor 12 drives a generator 14 via a rotor shaft. The generator generates electrical energy together with a converter 15 connected to it. The generator 14 is preferably designed as a dual-feed asynchronous generator, to the stator of which a line for conducting the electrical energy is directly connected, the line also being connected to the converter 15 that is joined in turn to a rotor of the generator 14. The line 17 is connected to a collection grid 9 within the wind farm via a transformer that is not shown. It can also be connected directly to a medium- or high-voltage grid 99 via a transformer. Also arranged on the nacelle 11 is an operating control unit 2 that is joined to a wind farm control center 8 by communication means (not shown). The operating control unit 2 manages the operation of the wind turbine 1 and to do so is provided with different specialized devices, including a speed regulator 21 for the wind rotor 12. The electrical power generated by the wind turbine 1 and output via the line 17 is recorded by a power measurement device 18 and applied to the operating control unit 2.

The wind turbine 1 can stand on its own. However, it is usually part of a wind farm that consists of multiple wind turbines 1, 1'. The other wind turbines 1' have a similar construction to the wind turbine 1 but it is not excluded that different types of wind turbines are also arranged in the wind farm. The wind farm control center 8, which is joined to the individual wind turbines 1, 1' via communication means (not shown), forms the high-level management center for the wind turbines 1, 1'. The electrical power generated by the different wind turbines 1, 1' is directed, via a collection grid 9 within the wind farm, to a link point at which the wind farm is connected via a transformer (not shown) to a medium- or high-voltage grid 99 that has the purpose of transmitting energy.

The operating control unit 2 comprises, with its speed regulator 21, a unit that determines the target value for a speed of the wind rotor 12 and interacts with a converter regulator 25 in such a way that such an electrical torque is set in order to obtain the corresponding speed of the wind rotor 12. The speed regulator 21 also interacts with the blade angle regulator 23 in such a way that a specific angle of attack of the rotor blades 13 (pitch angle) with respect to the wind flowing onto them is set in order to obtain a speed of the wind rotor 12. The interaction of the speed regulator 21 with the converter regulator 25 and the blade angle regulator 23 is regulated with the aid of the working point of the wind turbine 1. If the wind conditions are such that the wind turbine 1 can be operated only below its nominal power (alternatively also its nominal speed or the nominal wind), one refers to operating under partial load and the speed regulator interacts with the converter regulator 25. If the wind conditions are such that the wind turbine 1 can be operated with its nominal power, one refers to operating under nominal load and the speed regulator 21 interacts with the blade angle regulator 23. Within the range of the transition from operating under partial load to operating under nominal load, it can be provided that the speed regulator 21 interacts simultaneously with both the blade angle regulator 23 and the converter regulator 25.

Figure 2:
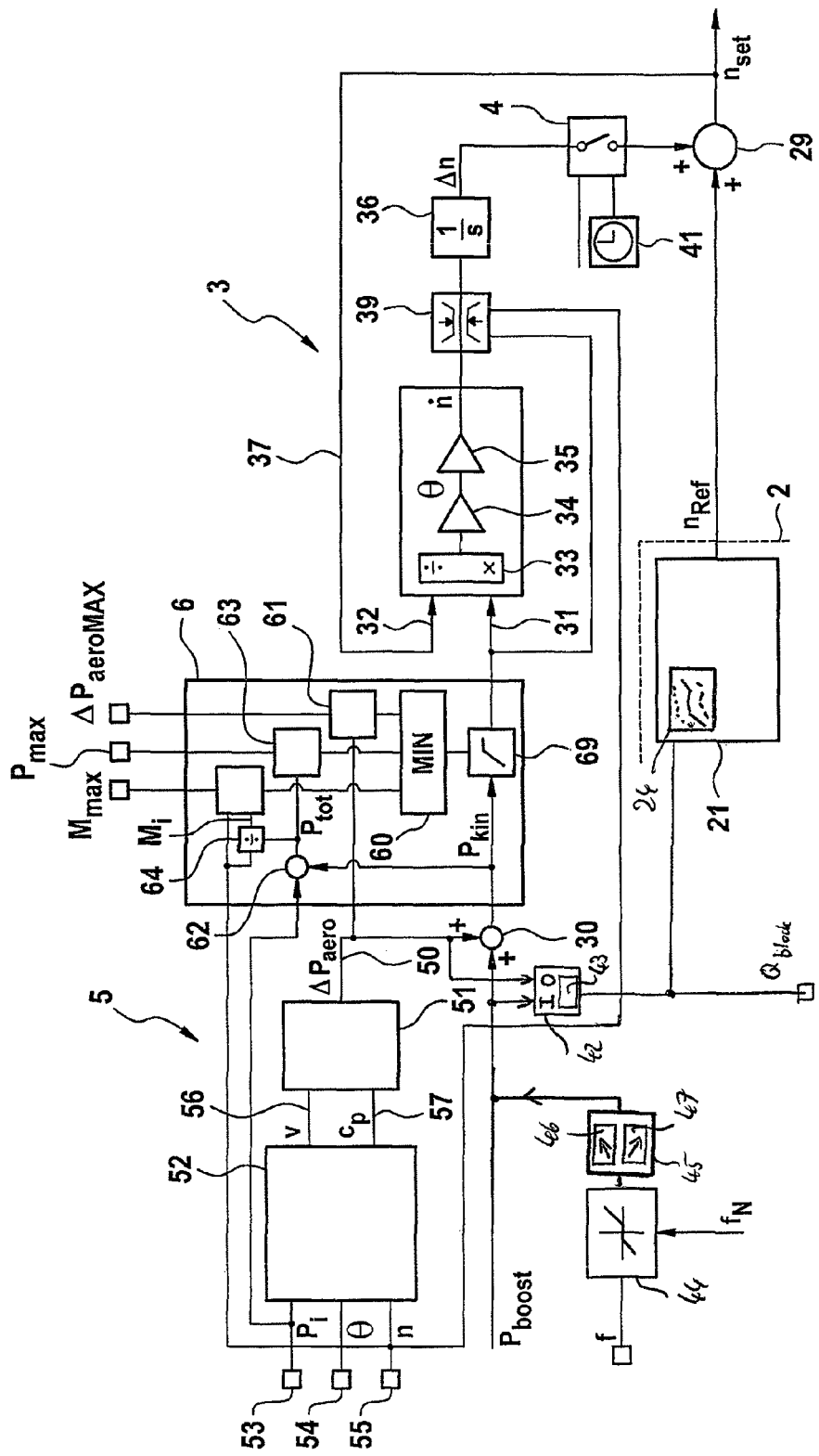
FIG. 2 shows a circuit diagram of an additional regulator and an additional correction element according to the exemplary embodiment of the invention.

The corresponding output of the target value for the speed from the speed regulator 21 is shown in FIG. 2. According to the invention, an additional regulator 3 is connected to this output line. To this effect, a logic element 29 is provided in the line, is designed as a summing element, and adds a value determined by the additional regulator 3 to the target value for the speed $n_{ref}$ calculated by the speed regulator 21 in order thus to generate the final target value $n_{set}$ for the converter control unit 25.

The additional regulator 3 has two inputs. A signal for kinetic energy $P_{kin}$ to be supplied is connected to its first input 31. A signal for the target speed $n_{set}$ is connected to its second input 32. The additional regulator 3 has a division element 33 that divides the value of the input 31 by that of the input 32. Transformation using a constant factor by means of a P element 34 results in a measure of the moment of inertia $\Theta$. This is divided by means of another P element 35 by a constant factor that corresponds to the rotational inertia J of the wind rotor 12. This results in a value for a speed reduction that is supplied to an integrator 36. The latter determines, by integration over a cycle time, a discrete differential value for the speed $\Delta n$ that is connected to the logic element 29. The corrected target value for the speed $n_{set}$ is thus formed. The latter is fed back to the second input 32 of the speed regulator via a feedback line 37.

The mode of operation is that, when kinetic power is required, a value for the moment of inertia $\Theta$ to be supplied by the centrifugal mass of the wind rotor 12 is formed by division by the respective current target value for the speed, and the necessary change of speed is calculated therefrom, taking account of the rotational inertia. This is added to the target value for the speed output by the operating control unit 2 via the logic element 29.

In the case of high wind speeds, at which the wind turbine 1 operates under nominal load, there is however no need to feed additionally required power from the kinetic energy of the wind rotor 12. A suppression module 4 is provided to prevent an undesired reduction in speed here. It is actuated by a nominal load signal that is made available by the operating control unit 2. If it is present, then there is no reduction in the values for the target speed output by the operating control unit 2. However, a reduction in speed can nevertheless advantageously be carried out dynamically, i.e. at the beginning of the requirement to boost the power or at its end. The purpose of this is to bridge the period until the blade angle regulator 23 can readjust sufficiently to provide the additional power without any reduction in speed. To do this, a time element 41 is preferably provided that enables the target value for the speed to be corrected for the period while the blade angle regulator 23 is active, as described above.

An additional correction element 5 is optionally also provided. It comprises an aerodynamic estimator 51 and a wind observer 52. Inputs are provided at the wind observer 52. The input 53 is for the electrical power generated (measured by the sensor 18). The second input is for the adjusted pitch angle that is transmitted by the blade angle regulator 23. A value for the speed of the generator 14 is supplied to a third input 55; this is preferably a measured value that is established by a sensor. The wind estimator 52 determines therefrom a value for wind speed v that is output at an output 56. A value for aerodynamic efficiency $c_P$ is also output at an output 57. The aerodynamic estimator 51 is designed so as to calculate the aerodynamically induced power loss $\Delta P_{aero}$ from the values for the wind speed v and that for the aerodynamic efficiency $c_P$. This can, for example, take place by means of its two-dimensional characteristic diagram. The corresponding value is output by the aerodynamic estimator 51 at an output 50. This value is added to an externally applied target value for required additional power $P_{boost}$ via a logic element 30 and thus the value for the power $P_{kin}$ to be provided from the kinetic system, which is applied to the additional regulator 3, is established. The value for the additional power required $P_{boost}$ can optionally also be generated locally at the wind turbine 1. To do this, a device for determining the additional power 44 is provided, to the input of which a signal for the frequency in the collection grid 98 is applied. If there are deviations from a target frequency $f_{nom}$ that can be set, then additional power is required. Its magnitude can be preset or is preferably determined from the degree of the frequency deviation. The device for determining the additional power 44 is expediently provided with a characteristic element for this purpose.

A threshold value monitoring module is optionally provided that is designated as a whole by the reference number 6. It comprises as a core element a limiter 69 that limits the signal for the power $P_{kin}$ to be provided from the kinetic system to a maximum value. This aspect of the invention may provide independent protection. The limiting can be to a fixed maximum value but is preferably performed adaptively and for multiple parameters. This is explained in detail below. The threshold value monitoring module 6 comprises multiple threshold signal modules 61, 63, 65 (three in the example shown). They are designed so as to monitor certain parameters with respect to predefinable threshold values and to transmit a corresponding signal to an evaluation logic circuit 60. Signals for the aerodynamic power loss $\Delta P_{aero}$ calculated by the aerodynamic estimator 51 and a predefinable maximum power loss value $\Delta P_{aeroMAX}$, for example $\Delta P_{aeroMAX}=20\%$ of nominal power, are applied to a first threshold signal module 61. The threshold signal module 61 compares these values and, when the maximum power loss value is exceeded, outputs its value to the evaluation logic circuit 60. Connected in series with a second threshold signal module 63 is a summing element 62 to which signals for the power of the wind turbine from the input 53 and for the required kinetic power $P_{kin}$ are applied and from which a total power demand $P_{tot}$ is formed and is applied to the second threshold signal module 63 as an input signal. A signal for a maximum permissible power $P_{max}$ is also applied to the second threshold signal module 63. If this value is exceeded, the second threshold signal module 63 outputs just this value to the evaluation logic circuit 60. A third threshold signal module 65 monitors whether the torque $M_b$ resulting from the power requirement remains below a permissible limit. A division element 64, that divides the total required power $P_{tot}$ by the speed, for example applied by the input 55, and so determines the required torque $M_b$, can be provided to determine this torque. If it exceeds a permissible threshold torque $M_{max}$, a correspondingly limited value is transmitted to the evaluation logic circuit 60.

The evaluation logic circuit 60 evaluates the various applied signals and determines therefrom a maximum value that is applied to the limiter 69. In the exemplary embodiment shown, the evaluation logic circuit 60 is designed as a select low logic circuit in which the lowest threshold value is decisive.

A characteristic switch module 24 for the speed regulator is optionally provided. In addition to the basic characteristic used in normal operation (see dashed line), it has at least one other characteristic that provides an increased torque (see solid line). It may also alternatively be provided that the characteristic switch module 24 provides a limiting characteristic for the normal operation and at least one limiting characteristic for a wider torque range (see dotted line) so that a wider operating range is made available to the torque/speed regulator.

A switch 42 with a fade-in/out element 43 is provided to actuate the characteristic switch module 24. The switch 42 monitors the signal transmission for the required additional power $P_{boost}$ and switches on when it is required and actuates the characteristic switch module 24. More active power is generated immediately by increasing the torque. In order to prevent an overcurrent, the output of reactive current is simultaneously greatly reduced or blocked altogether. To do this, a corresponding blocking signal $Q_{block}$ is output to the operating control unit 2. After the supply of required additional power is completed, a transition to restore normal operation takes place. However, this happens gradually rather than abruptly, in order to prevent lack of stability in the mechanical and electrical system of the wind turbine. To do this, the characteristic switch module 24 does not switch immediately back to normal operation but interacts with the fade-in/out element 43 in such a way that the original characteristic of normal operation is gradually restored. The fade-in/out element 43 is here designed in such a way that the original characteristic is resumed only when the wind turbine has resumed its normal operating point. To do this, the fade-in/out element 43 evaluates the signal for the aerodynamic power loss $\Delta P_{aero}$. If this value is zero or below a threshold that can be set, the normal operating point is resumed. It may also be provided that this fading in and out is performed by controlled switching to one or more transition characteristics.

A speed gradient module 39 is also provided. At the input 31, it monitors the discontinuation of the additional power requirement. A signal for the speed n of the wind rotor 14 is also applied. The speed gradient module 39 comprises a maximum and minimum gradient limiter. It is actuated at the end of the additional power requirement. At this point, the speed n of the wind rotor 14 is reduced from the initial value because of the removal of kinetic energy. The reduction may be considerable so that the wind rotor operates far outside its optimum operating conditions. A minimum gradient is therefore preset first so that the speed rises again quickly. The rise in speed is thus prioritized. On the other hand, too rapid a rise is prevented by a maximum gradient so that there is still sufficient power available to generate electrical energy. When a switching speed is reached, the maximum and minimum gradients are preferably modified, and to be precise reduced. The generation of energy to load the rise in speed is thus prioritized, the rise in speed then usually taking place more slowly.

Figure 3:
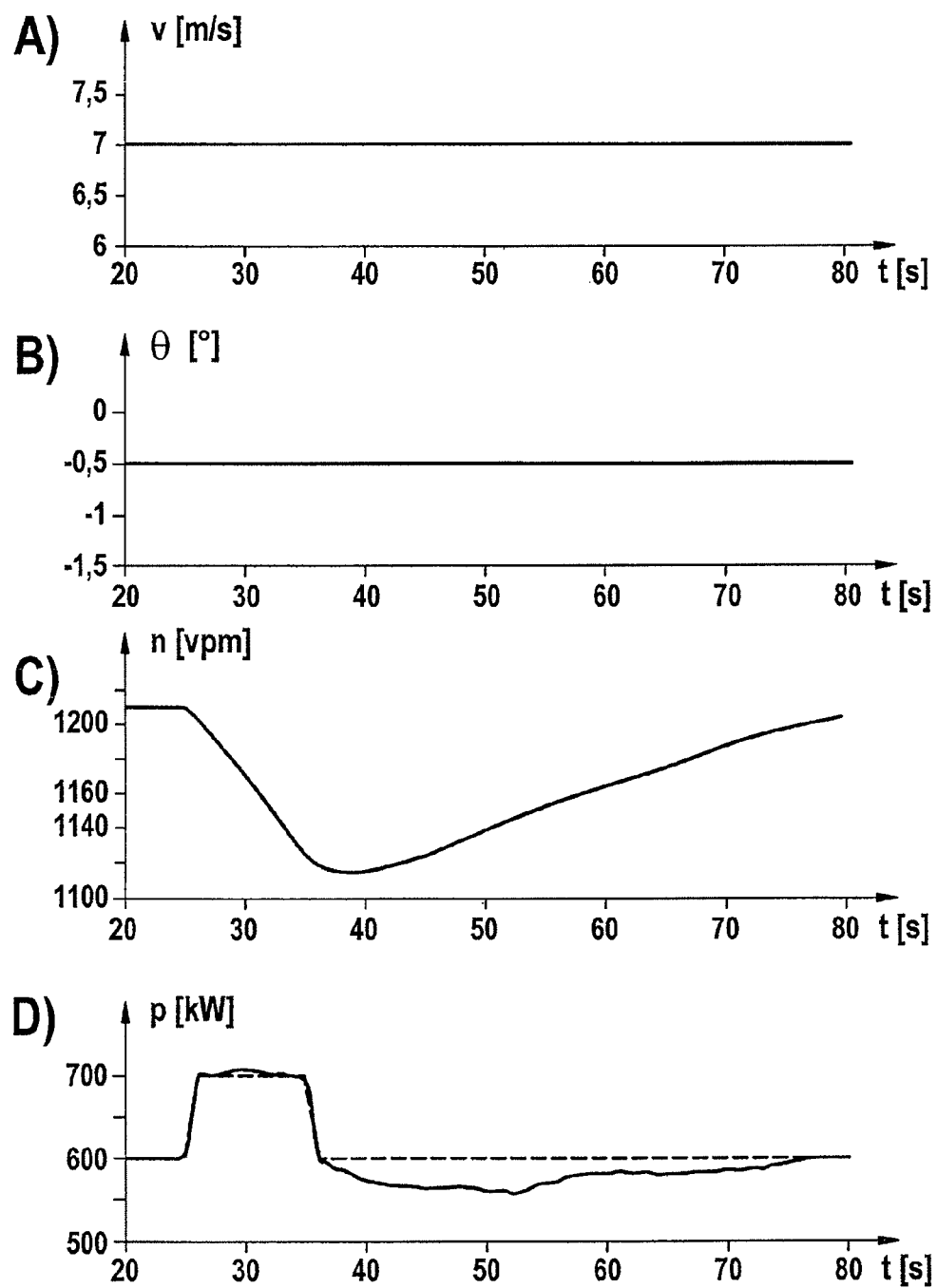
FIG. 3 shows a diagram with operating parameters in the case of a partial load.

The behavior shown in FIG. 3 thus results when operating under partial load. The wind speed can be assumed to be constant, as shown in FIG. 3A. Accordingly, the pitch angle of the rotor blades 13 is also constant (see FIG. 3B). At the point t=25 seconds, a requirement for 100 kW of boosted power is applied for 10 seconds (see dashed line in FIG. 3).

The additional regulator 3 continually determines a change of speed that is added to the original target value, resulting in a continual drop in speed in the period t=25 to t=35 seconds. As a result of this drop in speed, the kinetic energy in the wind rotor 12 is reduced, the resulting power is supplied to the generator and converter 14, 15 as additional power and output via the line 17 as primary balancing power (solid line in FIG. 3). At the end of the requirement, from the point t=35 seconds, the speed of the wind rotor 12 has dropped considerably so that subsequently the originally fed-in power cannot be set immediately but only after the speed has risen gradually (because of the relatively low wind speed it lasts for a considerable length of time, until the point t=80 seconds). The speed gradient module 39 hereby prioritizes the speed build-up during the first twenty seconds, whereas from t=55 the generation of power is prioritized with a rise in speed that then proceeds more flatly (lower speed gradient).

Figure 4:
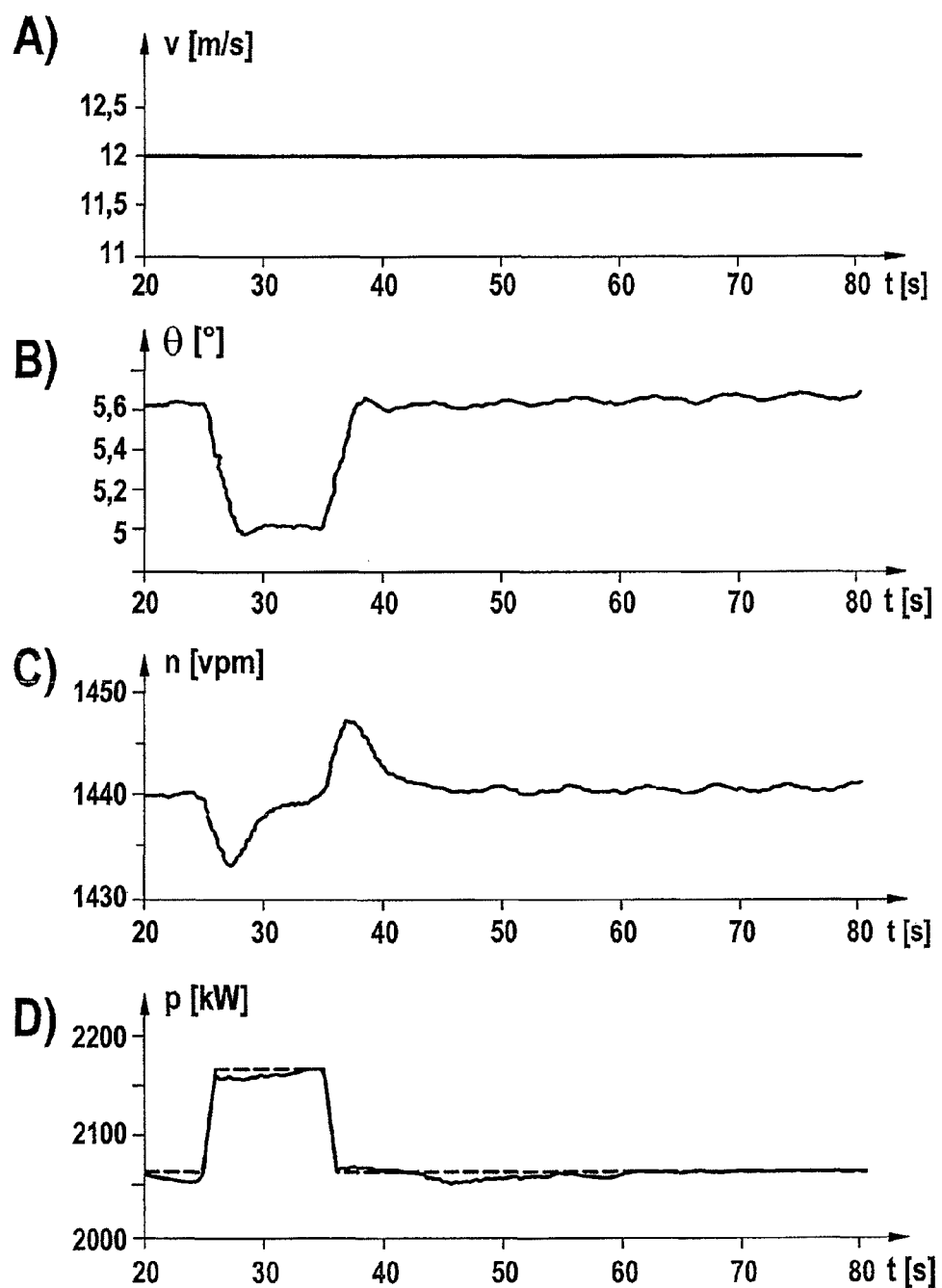
FIG. 4 shows a diagram with operating parameters in the case of a full load.

In FIG. 4, a requirement for additional power from t=25 seconds for 10 seconds is shown; in contrast to the image in FIG. 3, however, the wind turbine is operating under nominal load. The wind speed (see FIG. 4A) is accordingly higher and is above the nominal wind speed of 11 m/s. This enables the additional power to be generated from the wind itself, and for this reason the pitch angle of the rotor blades 13 needs to be adjusted; this is shown in FIG. 4B. It can be seen that the adjustment of the pitch angle lasts for a short period of time, and to be precise for approximately 2 seconds in the exemplary embodiment shown. In order to be able to continue to provide the required additional power during this period too, the speed is reduced by the suppression module 4 in conjunction with its start module 41 at the beginning of the requirement for additional power, as described above. This can be stopped when the pitch angle has reached its value at the point t=28 seconds. The suppression module 4 then prevents the speed reduction so that the speed then rises again and slowly reaches its initial value. The same thing is repeated, in reverse, at the point t=35 seconds when there is no longer a requirement for additional power. It can be seen in FIG. 4D that a good match between the required power (dashed line) and the output power (solid line) is achieved by the action of the start module 41 in each case at the beginning and end of the demand for the additional power at t=25 and 35 seconds and by the suppression module 4 in the period in between.

The mode of operation of the aerodynamic estimator 51 is shown in detail in FIG. 5. Operation is again under partial load (compare FIG. 3), in which additional power is required at point t=25 seconds for 10 seconds. The additional power is provided by a continual speed reduction (see FIG. 5A), as a result of which the electrical power can be increased by the required value (see FIG. 5B). Because the aerodynamic conditions at the wind rotor 12 become poorer and poorer as the speed falls, the wind turbine 1 operates in a deoptimized fashion. The resulting induced loss of power is determined by the aerodynamic estimator 51. This value is shown in FIG. 5C. It can be seen that this value reaches a magnitude that is more than half of the additional power made available and so cannot be ignored. Despite this considerable induced loss, thanks to the aerodynamic estimator 51 provided the required additional power can be provided in a stable fashion over the period.

Figure 6:
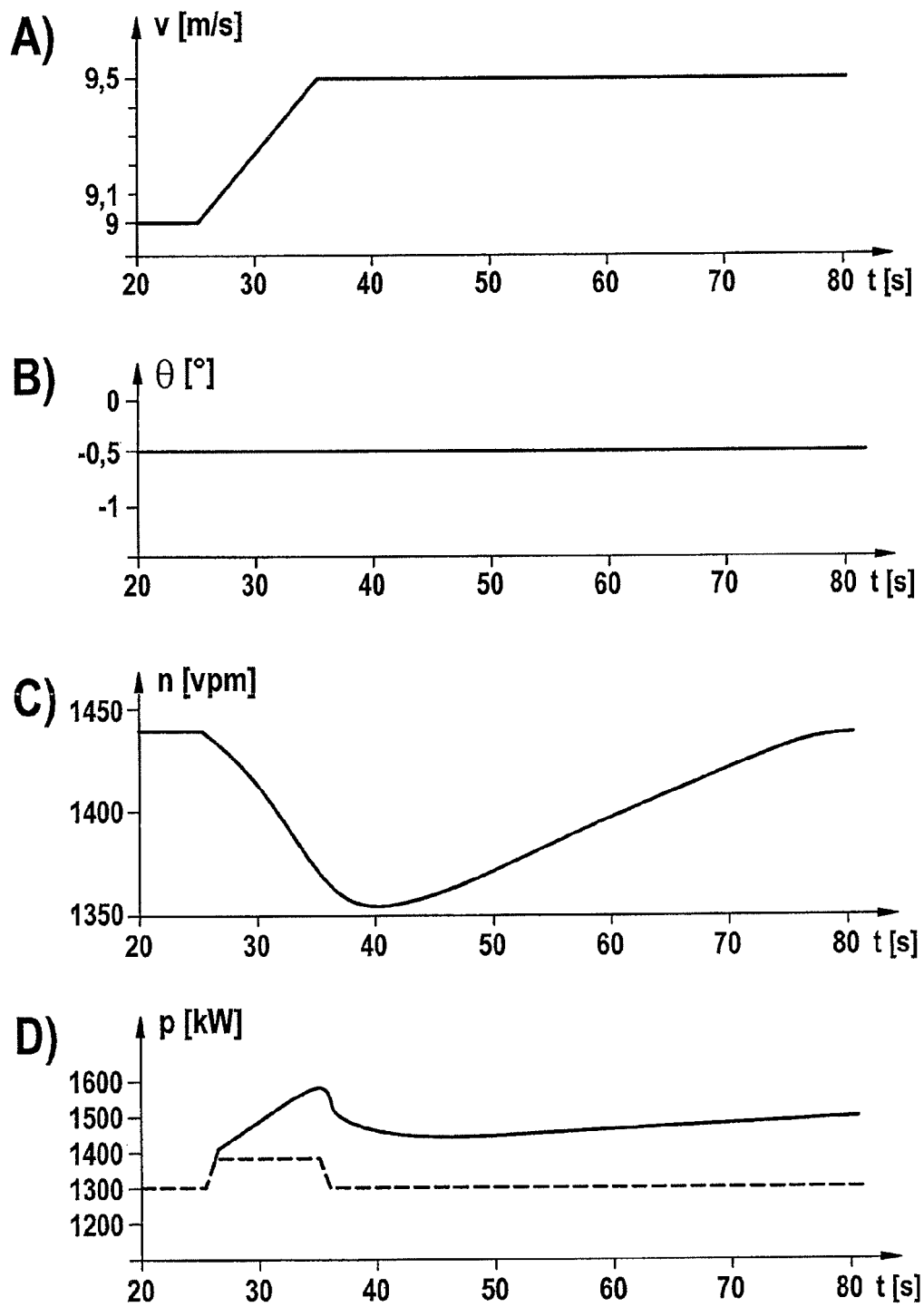
FIG. 6 shows a diagram according to FIG. 3 in the case of non-stationary wind.

FIG. 6 shows the behavior of the additional regulator 3 according to the invention in the case of non-stationary wind conditions, in particular when there is increasing wind. As in the case shown in FIG. 3 too, additional power is required at point t=25 seconds for 10 seconds. At the same time, the wind speed (FIG. 6A) begins to rise. The required power (which does not take into account the rise in wind speed that was not known in advance) is shown with a dashed line in FIG. 6D. The actual power output is shown with a solid line. It can be seen that the actual power output by the wind turbine rises together with the rise in wind speed, and yet excess power—as required—is output, as can be seen clearly by the drop in the power output at the point at which the requirement ends at t=35 seconds. Thanks to the additional regulator according to the invention, use can thus be made of both the increased wind speed and the power supply that is increased thereby, and moreover the required additional power can additionally be provided to effect the primary balancing. This shows that the invention works optimally for non-stationary conditions too.

Figure 7:
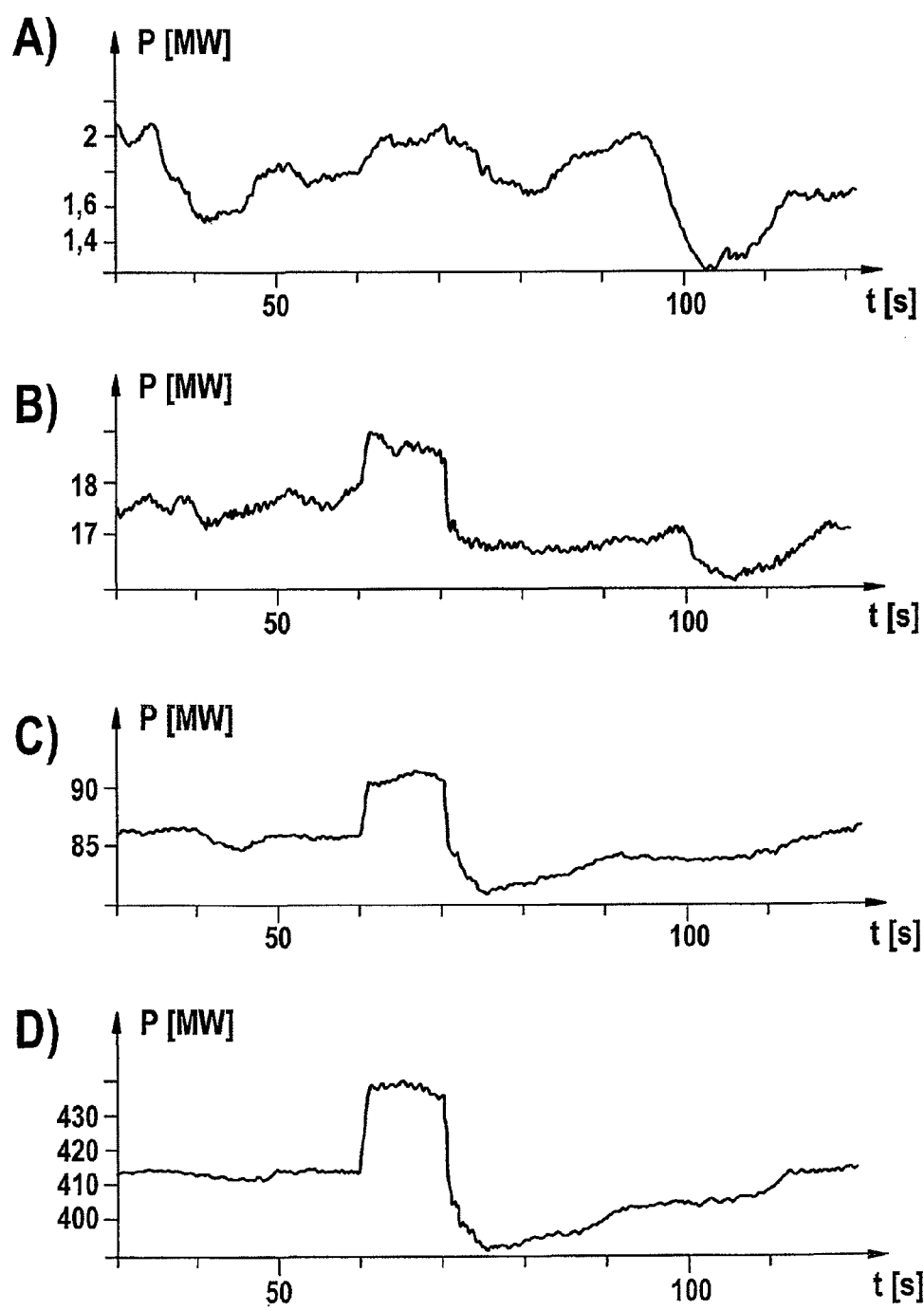
FIG. 7 shows power diagrams for different wind farms.

The application of the invention in a wind farm having multiple wind turbines is shown in FIG. 7. FIG. 7A functions as a reference and shows a single wind turbine, FIG. 7B shows a wind farm with 10 wind turbines, FIG. 7C shows a wind farm with 50 wind turbines, and FIG. 7D shows a wind farm with 240 wind turbines. In each case, a requirement for additional power amounting to 5% of the installed power occurs for 10 seconds at the point t=60 seconds. In the case of the single wind turbine, it is barely possible to tell that this additional power has been satisfied because the corresponding rise in power is obscured by the power differences caused by modified wind speeds. In the case of a wind farm with ten wind turbines (FIG. 7B), the stochastic changes in wind speed are partially averaged out so that the additional power becomes more visible. This effect is intensified for wind farms with more wind turbines (FIG. 7C and FIG. 7D) and it can ultimately be seen in FIG. 7D that the stochastic fluctuations are virtually balanced out by the large number of wind turbines. Large wind farms in which the invention is applied are thus extremely well suited to providing additional power.

In the case of a wind farm having a wind farm control center, it may be provided that the required additional power is distributed to the individual wind turbines by the wind farm control center. The target value for the additional power of the wind farm is distributed to the individual wind turbines in proportion to the amount of power it contributes to the total power of the wind farm. However, the moments of inertia of the rotors of all the wind turbines present in the wind farm can preferably be determined by the wind farm control center and the target values for the additional power of the individual wind turbines can preferably be determined depending on the proportion of the moment of inertia of the rotors of the individual wind turbines in relation to the sum of the moments of inertia of the rotors in the wind farm.

Two examples for different increasing and decay functions for the additional power that needs to be fed in by the wind turbine in the event of a frequency disruption are shown in FIGS. 8a and b. These functions are implemented in a dynamic module 45 (see FIG. 2). Because the increase and decay functions differ, they are each implemented independently in an increasing element 46 and a decay element 47 respectively. In the case of FIG. 8a, the increasing element is designed in such a way that, when a grid disruption occurs at the 10 sec point, 10% additional power is additionally fed in, to be precise for 10 seconds. Immediately thereafter, the decay element 47 takes over, which removes the additional power and ensures that at least 80% of the power fed in before the frequency disruption occurred is fed in during the recovery phase too, to be precise for 20 seconds. To do this, the dynamic module 45 can expediently interact with the abovedescribed gradient module 36.

A different dynamic curve is shown in FIG. 8b. The increase and decay here differ very markedly. It is provided that, as soon as the frequency deviation occurs at the 10 sec point, the increasing element 46 immediately switches to maximum additional power, which then falls in a hyperbola for as long as the frequency disruption continues (until approximately the 20 sec point). The hatched area below the curve is hereby a measure of the kinetic energy removed from the wind rotor. When the frequency returns slowly to its original value at the end of the disruption, the decay element 47 can ensure, with a slight undershoot, that the original situation is obtained after 30 seconds. By means of such an implementation in the dynamic module, the wind turbine can behave relative to the grid like a large synchronous generator of a conventional power station. By virtue of this aspect of the invention, its good grid-supporting property can be transferred to the wind turbine.

The invention claimed is:

1. A wind turbine comprising:
   a wind rotor,
   a generator driven by the wind rotor and which interacts with a converter to generate electrical power,
   a speed regulator outputting a target speed signal,
   a converter control unit,
   an additional speed regulation system that has an input for additional power and is configured to:
      generate from the input for additional power a speed change signal, taking into account a moment of inertia of the rotor, and
      output the speed change signal as an output signal, and
   a combiner element that has inputs for the target speed signal and the speed change signal, wherein the combiner element is configured to output a corrected target speed signal to the converter control unit by combining the target speed signal and the speed change signal.

2. The wind turbine as claimed in claim 1, comprising a correction element that is configured to modify parameters of the additional speed regulation system as a function of the additional power called up.

3. The wind turbine as claimed in claim 2, comprising an aerodynamic estimator that estimates the aerodynamic efficiency or power of the wind turbine.

4. The wind turbine as claimed in claim 3, comprising a wind observer that determines a wind speed from power and speed data and transmits it to the aerodynamic estimator.

5. The wind turbine as claimed in claim 1, comprising a suppression element that blocks the additional speed regulation system when operating under full load.

6. The wind turbine as claimed in claim 1, comprising a module for monitoring threshold values that is configured to limit or deactivate the additional speed regulation system as a function of the threshold value being violated.

7. The wind turbine as claimed in claim 1, wherein the additional speed regulation system has a torque limiting element.

8. The wind turbine as claimed in claim 1, comprising a characteristic switching module for the speed regulator that switches to a characteristic with a higher torque when there is additional power.

9. The wind turbine as claimed in claim 1, comprising a device for determining the additional power that is configured to determine the additional power using the frequency measured in a grid.

10. The wind turbine as claimed in claim 9, wherein the device for determining the additional power interacts with a dynamic module.

11. The wind turbine as claimed in claim 1, wherein the additional speed regulation system has a speed gradient module that is configured to specify a minimum gradient for the rise in speed after the supply of additional power is completed.

12. A wind farm having a wind farm control center and multiple wind turbines, the wind turbines each being provided with a wind rotor, a generator driven by the wind rotor and which interacts with a converter to generate electrical power, a speed regulator outputting a target speed signal and a converter control unit, and at least a fraction of the wind turbines being provided with an additional speed regulation system that has an input for additional power and is configured to generate a speed change signal from the input for additional power, taking into account a moment of inertia of the rotor, and to output the speed change signal as an output signal, and a combiner element that has inputs for the target speed signal and the speed change signal, wherein the combiner element is configured to output a corrected target speed signal to the converter control unit by combining the target speed signal and the speed change signal, the wind farm control center having an inertia control module that apportions required additional power to the said fraction of the wind turbines.

13. The wind farm as claimed in claim 12, wherein the inertia control module is configured to apportion the additional power evenly to the rotating wind turbines.

14. A method for operating a wind turbine that comprises a wind rotor, a generator driven by the wind rotor and which interacts with a converter to generate electrical power, a speed regulator, a converter control unit, an additional speed regulation system, and a combiner element, the method comprising:
   outputting a target speed signal from the speed regulator to the combiner element,
   generating by the additional speed regulation system from an input for additional power, a speed change signal, taking into account a moment of inertia of the rotor,
   outputting the speed change signal as an output signal from the additional speed regulation system to the combiner element, and
   outputting, by the combiner element, a corrected target speed signal to the converter control unit by adding the change of speed signal to the target speed signal.

15. The method as claimed in claim 14, comprising modifying parameters of the additional speed regulation system as a function of the additional power called up.

16. A method for operating a wind farm having a wind farm control center and multiple wind turbines, the wind turbines each being provided with a wind rotor, a generator driven by the wind rotor and which interacts with a converter to generate electrical power, a speed regulator and a converter control unit, and at least a fraction of the wind turbines being provided with an additional speed regulation system and a combiner element, the method comprising:
   outputting a target speed signal from the speed regulator to the combiner element, for the at least a fraction of the wind turbines,
   generating by the additional speed regulation system from an input for additional power, a speed change signal, taking into account a moment of inertia of the rotor, for the at least a fraction of the wind turbines,
   outputting the speed change signal as an output signal to the combiner element, for the at least a fraction of the wind turbines,
   outputting, by the combiner element, a corrected target speed signal to the converter control unit by adding the change of speed signal to the target speed signal, for the at least a fraction of the wind turbines, and
   apportioning the required additional power to the fraction of the wind turbines by the wind farm control center.

17. The method as claimed in claim 16, comprising apportioning the additional power evenly to the rotating wind turbines.

18. The wind turbine as claimed in claim 2, comprising an aerodynamic estimator that estimates the aerodynamic efficiency and power of the wind turbine.

19. The wind turbine as claimed in claim 1, comprising a suppression element that blocks the additional speed regulation system when operating under full load and interacts with a start module that is configured to override the suppression module in the event of changes in additional power.

20. The wind turbine as claimed in claim 1, comprising a module for monitoring threshold values that is configured to limit or deactivate the additional speed regulation system as a function of the threshold value being violated when a threshold value for an aerodynamic efficiency, an electrotechnical limit or a speed-dependent torque threshold characteristic is exceeded.

21. The wind turbine as claimed in claim 1, comprising a module for monitoring threshold values that is configured to limit or deactivate the additional speed regulation system as a function of the threshold value being violated when a threshold value for an aerodynamic efficiency, an electrotechnical limit and a speed-dependent torque threshold characteristic is exceeded.

22. The wind turbine as claimed in claim 1, wherein the additional speed regulation system has a torque limiting element that is configured to limit the change of speed.

23. The wind turbine as claimed in claim 1, comprising a characteristic switching module for the speed regulator that switches to a characteristic with a higher torque when there is additional power, a limit signal being generated to decrease the output of reactive power.

24. The wind turbine as claimed in claim 1, comprising a characteristic switching module for the speed regulator that switches to a characteristic with a higher torque when there is additional power, a limit signal being generated to decrease the output of reactive power and gradually being switched back to the original characteristic by a fade-in/out element when the supply of additional power is completed.

25. The wind turbine as claimed in claim 1, comprising a device for determining the additional power that is configured to determine the additional power using the frequency measured in a grid using a frequency-dependent characteristic element.

26. The wind turbine as claimed in claim 9, wherein the device for determining the additional power interacts with a dynamic module that determines the additional power from the depth or the time gradients of a dip in the frequency in a grid.

27. The wind turbine as claimed in claim 9, wherein the device for determining the additional power interacts with a dynamic module that determines the additional power from the depth and the time gradients of a dip in the frequency in a grid.

28. The wind turbine as claimed in claim 9, wherein the device for determining the additional power interacts with a dynamic module that determines the additional power from the depth or the time gradients of a dip in the frequency in a grid, and separately for a beginning of a requirement for the additional power by an increasing element and for an end of the requirement for the additional power by a decay element.

29. The wind turbine as claimed in claim 9, wherein the device for determining the additional power interacts with a dynamic module that determines the additional power from the depth or the time gradients of a dip in the frequency in a grid, and separately for a beginning of a requirement for the additional power by an increasing element and for an end of the requirement for the additional power by a decay element that have implemented different functions.

30. The wind turbine as claimed in claim 1, wherein the additional speed regulation system has a speed gradient module that is configured to specify a minimum gradient for the rise in speed after the supply of additional power is completed and a maximum gradient.

31. The wind farm as claimed in claim 12, wherein the inertia control module is configured to apportion the additional power evenly to the rotating wind turbines, and is configured to apportion the additional power to the rotating wind turbines in such a way that the proportion of additional power of the individual wind turbines is determined from the ratio of the proportion of the moment of inertia of the rotors of the individual wind turbines in relation to the sum of the moments of inertia of the rotors of the rotating wind turbines in the wind farm.

* * * * *